United States Patent [19]

Ishida

[11] Patent Number: 4,747,666

[45] Date of Patent: May 31, 1988

[54] MULTI-LAYER INTERFERENCE FILTER

[75] Inventor: Masahiko Ishida, Kyoto, Japan

[73] Assignee: Horiba, Ltd., Kyoto, Japan

[21] Appl. No.: 875,873

[22] Filed: Jun. 18, 1986

[30] Foreign Application Priority Data

Jun. 25, 1985 [JP] Japan .................................. 60-140063

[51] Int. Cl.$^4$ .............................................. G02B 1/10
[52] U.S. Cl. ..................................... 350/164; 350/166
[58] Field of Search ................................ 350/166, 164

[56] References Cited

U.S. PATENT DOCUMENTS 2,890,624  6/1959  Widdop et al. ...................... 350/166
4,147,409  4/1979  Apfel .................................... 350/166

*Primary Examiner*—Bruce Y. Arnold
*Attorney, Agent, or Firm*—Wenderoth, Lind & Ponack

[57] ABSTRACT

Three stacks composed of high refractive index substance layers and low refractive index substance layers, which are alternately arranged, are formed on one side of a substrate. Of the three stacks, the central stack has a number of layers which are about half the number of all the layers and each individual layer is set so as to be a desired optical quarter-wave thickness. Two stacks are arranged on opposite sides of said central stack, which stacks each have a number of layers of about $\frac{1}{4}$ times the number of all the layers and which are set so as to be different in optical thickness from each other and different from the desired quarter wave optical thickness of the central stack layers, said stack combination being capable of easily producing a multi-layer interference filter having good spectrometic characteristics.

2 Claims, 2 Drawing Sheets

MULTI-LAYER INTERFERENCE FILTER

BACKGROUND OF THE INVENTION

1. Field of the Invention

The present invention relates to a multi-layer interference filter, in particular to a multi-layer interference filter for use in an optical communication and the like.

2. Description of the Prior Art

In general, a multi-layer interference filter shows a steep rise in spectrometric transmission versus wavelength if the number of layers thereof is increased, thereby improving the discriminating accuracy. However, on the other side, a disadvantage occurs in that the number of ripples ordinarily produced are increased as the number of layers are increased. In addition, it becomes more difficult to produce the filter as the number of layers are increased.

Accordingly, it is preferable that the production of a multi-layer interference filter is carried out while taking the above-described advantages and disadvantages into consideration.

A multi-layer interference filter has been used in optical communication and the like in recent years and is published in Shingaku-Giho OQE 82-14, page 70, left column. One of the filters having the construction of BK7//1.25M, 1.25L, (H/2 L H/2)$^{10}$, 1.25L, 1.25M//BK-7 has been described in a publication. Here, BK-7 is a trade name which designates the type of glass material composing the substrate, H designates $TiO_2$ as a highly refractive substance layer, L designates $SiO_2$ as a low refractive substance layer, and M designates $Al_2O_3$.

However, a multi-layer interference filter of the above-described construction is composed of almost only quarter-wave optical thickness layers, so that it is advantageous in monitoring only three kinds of volatile substances and thus had distinct disadvantages. Besides, as shown by line B in FIG. 2, defects occur in that the rising characteristics are deteriorated and spectrometric characteristics are not always sufficient, for example the ripples are increased.

SUMMARY OF THE INVENTION

The present invention was achieved in an effort to solve the aforementioned difficulties and it is an object of the present invention to provide a multi-layer interference filter which is superior in spectrometric characteristics and easy to produce.

To this end, the present inventor has achieved the following construction of the present invention after various kinds of experiments in which only two kinds of vapor deposition substances were used, while keeping in mind that the number of layers which are shifted from the optical quarter-wave thickness be reduced as much as possible.

That is to say, the multi-layer interference filter according to the present invention comprises a substrate and a first stack, a second stack and a third stack, each stack composed of a high refractive index layer and a low refractive index layer, which are alternately arranged. Of said three stacks, the central, first stack, has a number of layers about half the number of all the layers and each individual layer is set so as to have a desired quarter-wave optical thickness. On the other hand, the second stack and the third are arranged on opposite sides of said first stack and each have a number of layers of about ¼ times the number of all layers, and each individual layer is set so that the individual layers of both the second and third stack each have an optical thickness which is different from each other and is different from the desired quarter-wave optical thickness of the first, or central, stack layer.

With the above-described characteristic construction, two kinds of vapor deposition substances—a highly refractive substance and a low refractive substance—are vapor coated on a substrate, so that a multi-layer interference filter can be produced which is easier to produce in comparison with the conventional one. In addition, since the central stack has a number of layers about half the number of all layers and each individual layer thereof is set so as to be a quarter-wave optical thickness while the stacks arranged on opposite sides of said central stack have a number of layers about ¼ times the number of all layers with each individual layer having different optical thicknesses as described above, the rising characteristics are improved and spectrometric characteristics with reduced ripples can be obtained.

DESCRIPTION OF THE PREFERRED EMBODIMENT

Figure 1:
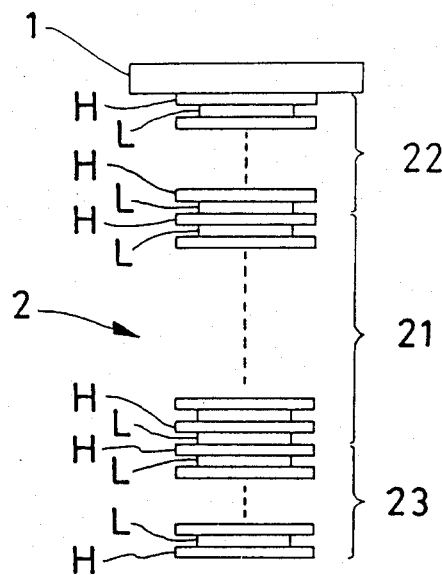
FIG. 1 is a side view showing a multi-layer interference filter according to the present invention.

Referring now to FIG. 1, which shows the construction of a multi-layer interference filter according to the present invention, reference numeral 1 designates a substrate formed of, for example, BK-7, silica and the like. Reference numeral 2 designates a multi-layer composed of three stacks (a first stack 21, a second stack 22, and a third stack 23) comprising a high refractive index substance layer H and a low refractive index substance layer L, which are alternately arranged, formed on one side of the substrate 1. The high refractive index substance layer H and the low refractive index substance layer L composing each of the stacks 21, 22 and 23 is formed by a known vacuum vapor deposition method with $TiO_2$ and $SiO_2$ as the volatile substances, respectively. The total number of layers of the multi-layer is 41.

Table 1 shows one example of a construction of each of the stacks 21, 22 and 23 in the above-described multi-layer 2.

TABLE 1

| | Layer No. | Refractive index | Theoretical quarter-wave optical film thickness |
|---|---|---|---|
| | 1 | H (2.30) | 0.650 |
| | 2 | L (1.46) | 0.719 |
| | 3 | H (2.30) | 1.189 |
| | 4 | L (1.46) | 0.874 |
| Second stack | 5 | H (2.30) | 0.895 |
| | 6 | L (1.46) | 1.020 |
| | 7 | H (2.30) | 1.039 |
| | 8 | L (1.46) | 0.923 |
| | 9 | H (2.30) | 0.989 |
| | 10 | L (1.46) | 1.002 |
| | 11 | H (2.30) | 1.000 |
| | 12 | L (1.46) | 1.000 |
| | 13 | H (2.30) | 1.000 |
| | 14 | L (1.46) | 1.000 |
| | 15 | H (2.30) | 1.000 |

TABLE 1-continued

|  | Layer No. | Refractive index | Theoretical quarter-wave optical film thickness |
|---|---|---|---|
| First stack | 16 | L (1.46) | 1.000 |
|  | 17 | H (2.30) | 1.000 |
|  | 18 | L (1.46) | 1.000 |
|  | 19 | H (2.30) | 1.000 |
|  | 20 | L (1.46) | 1.000 |
|  | 21 | H (2.30) | 1.000 |
|  | 22 | L (1.46) | 1.000 |
|  | 23 | H (2.30) | 1.000 |
|  | 24 | L (1.46) | 1.000 |
|  | 25 | H (2.30) | 1.000 |
|  | 26 | L (1.46) | 1.000 |
|  | 27 | H (2 30) | 1.000 |
|  | 28 | L (1.46) | 1.000 |
|  | 29 | H (2.30) | 1.000 |
|  | 30 | L (1.46) | 1.000 |
| Third stack | 31 | H (2.30) | 0.904 |
|  | 32 | L (1.46) | 1.148 |
|  | 33 | H (2.30) | 0.903 |
|  | 34 | L (1.46) | 0.953 |
|  | 35 | H (2.30) | 1.007 |
|  | 36 | L (1.46) | 1.095 |
|  | 37 | H (2.30) | 0.803 |
|  | 38 | L (1.46) | 0.927 |
|  | 39 | H (2.30) | 1.165 |
|  | 40 | L (1.46) | 0.702 |
|  | 41 | H (2.30) | 0.661 |

As shown in the above Table 1, the first stack 21 forms an almost central portion of the multi-layer 2 and the number of layers thereof is 20 (No. 11–No. 30) which occupies about half the number of all layers. And, each individual layer of the first stack 21 is set so as to be a quarter-wave optical thickness.

The number of layers of the second stack 22 and the third stack 23 arranged adjacent to the first stack 21 on opposite sides of the first stack 21 is 10 (No. 1–No. 10) and 11 (No. 31–No. 41), respectively, which is about ¼ times the number of all layers. And, each individual layer of both these stacks 22 and 23 is set to have an optical thickness different from that of the first stack 21 so as to be shifted from a quarter-wave optical thickness. The practical shift can be calculated by an optimizing method used by persons skilled in the art.

Figure 2:
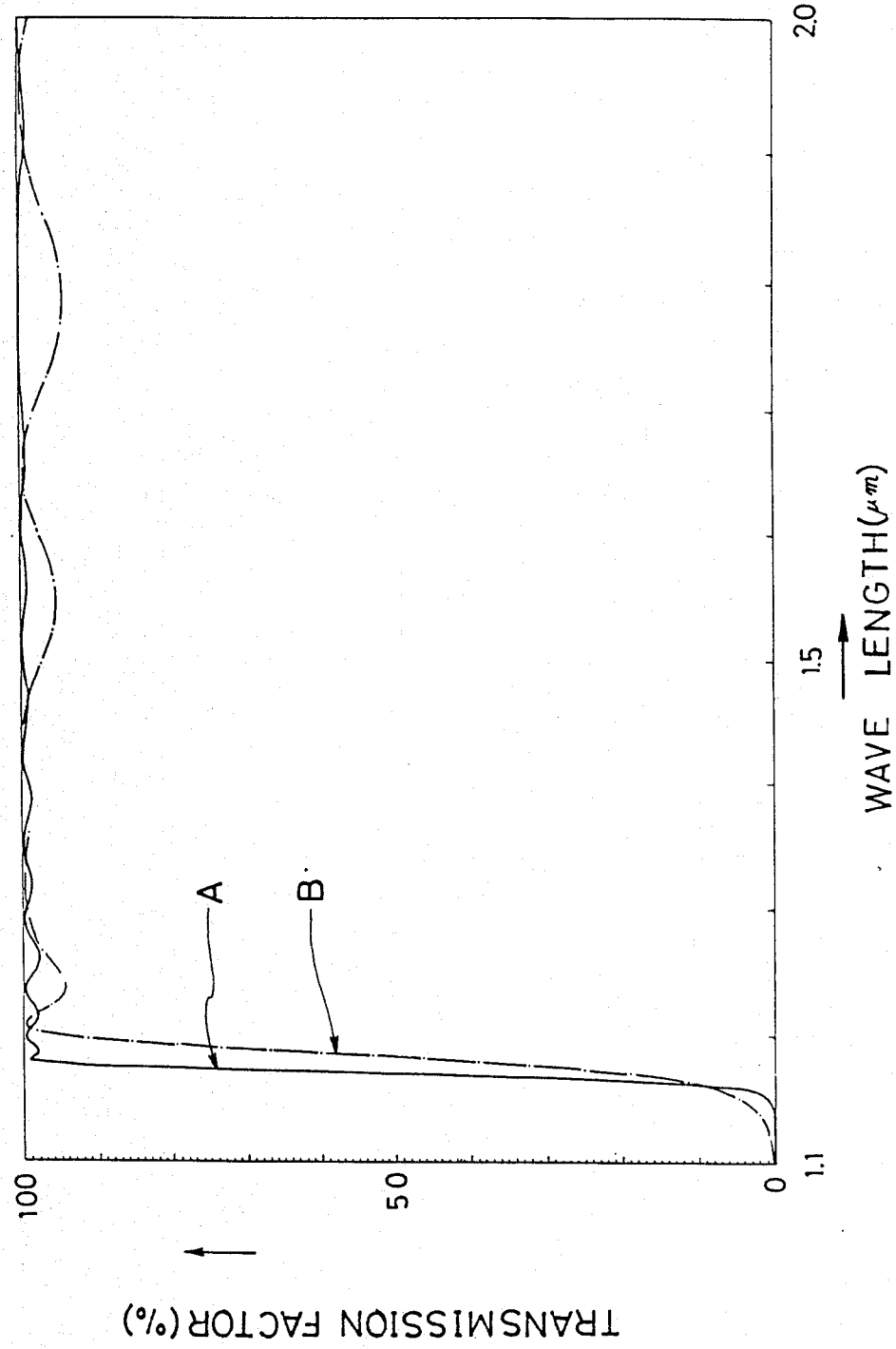
FIG. 2 is a diagram for comparing the theoretical spectrometric characteristics.

The theoretical spectrometric characteristics of a multi-layer interference filter constructed in the above-described manner are shown by the full line A in FIG. 2. The multi-layer interference filter according to the present invention is improved in spectrometric characteristics in spite of the large number of layers (41 layers). For example, it shows steeper rising characteristics and reduced ripples in comparison with a conventional one having a reduced number of layers (24 layers) (shown by an imaginary line B).

Figure 3:
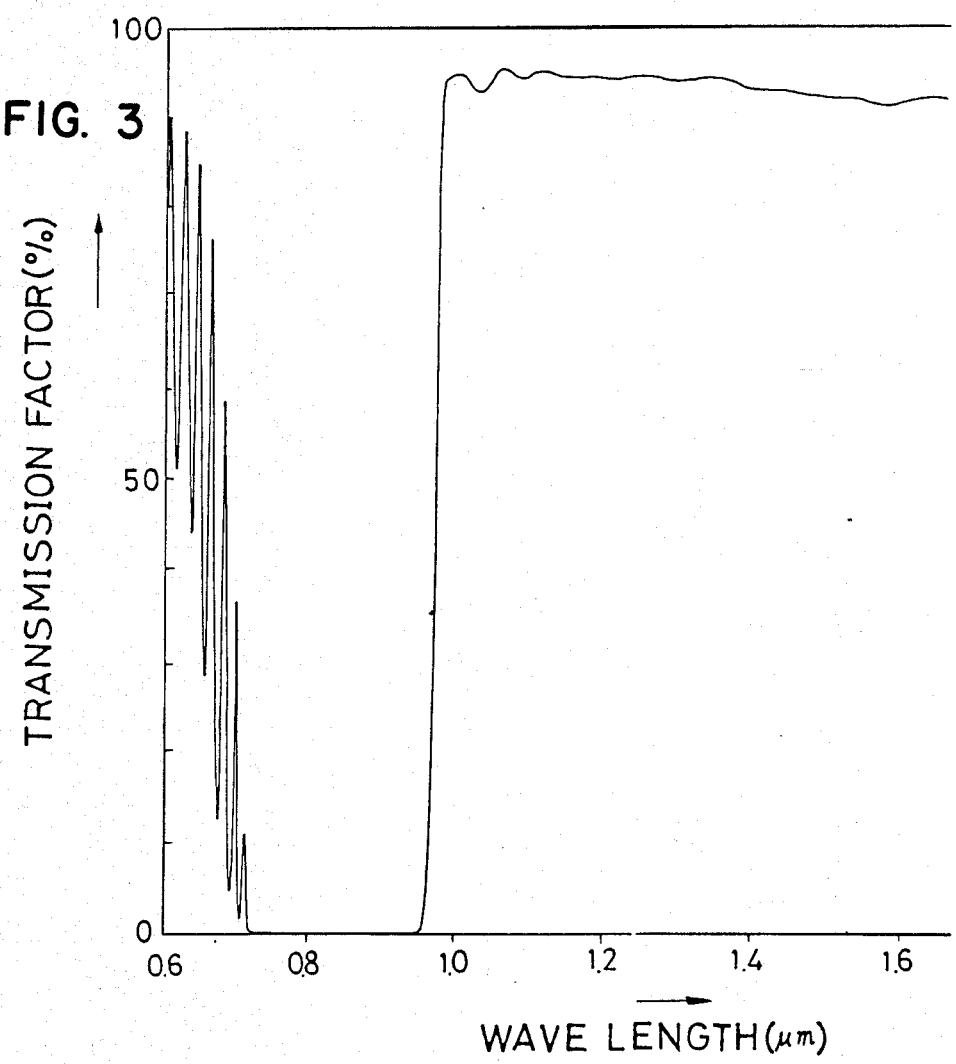
FIG. 3 is a diagram showing the spectrometric characteristics of a multi-layer interference filter according to the preferred embodiment of the present invention.

FIG. 3 shows the spectrometric characteristics measured on a multi-layer interference filter produced on the basis of said Table 1. The transmission factor is slightly lower than the theoretical value as shown in FIG. 2, but the rising characteristics and the state of ripples present are remarkably good.

In addition, the number of layers in a multi-layer interference filter is 41 in the above-described embodiment, but it goes without saying that the present invention is not limited to this. Additionally, it goes without saying that the theoretical film thickness is not limited to the ones shown in Table 1.

As described above in detail, since only two kinds of substances—a high refractive index substance and a low refractive index substance—are used for forming a multi-layer in the present invention, the production of a multi-layer can be very easily carried out. Since a second stack and a third stack are arranged on both sides of a first stack having a number of layers about half the number of all layers in the multi-layer with the first stack as a center and have a number of layers about ¼ times the number of all layers, each individual layer of the first stack is set so as to be a desired quarter-wave optical thickness (being advantageous in monitoring as much as that), and each individual layer of the second stack and the third stack are set so that the optical thicknesses are different from each other and different from the desired quarter-wave of the central layers as described above, the spectrometric characteristics can be improved in comparison with the conventional multi-layer interference filter.

What is claimed is:

1. A multi-layer interference filter, comprising a substrate, a first stack, a second stack and a third stack, said stacks composed of high refractive index layers and low refractive index layers, which are alternately arranged, the first stack of said three stacks being a central stack having a number of layers about half of the number of all layers and which layers are set to a desired optical quarter-wave thickness, and wherein the second stack and the third stack are each arranged on opposite sides of said first stack and have a number of layers of about ¼ times the number of all layers and which layers are set so that the individual layers of both the second and third stacks each have an optical thickness which is different from each other and is different from said desired quarter-wave optical thickness of the layers of the first stack.

2. A multi-layer interference filter as set forth in claim 1, in which the high refractive index layers are formed of $TiO_2$ and the low refractive index layers are formed of $SiO_2$ and the substrate is formed of BK-7 glass or silica and wherein the layers are formed by a vacuum vapor deposition method.

* * * * *